C. R. MYERS.
TREE SURGERY.
APPLICATION FILED NOV. 15, 1912.

1,076,441.

Patented Oct. 21, 1913.

INVENTOR
CHARLES R MYERS.
BY Fisher ... ATTYS.

UNITED STATES PATENT OFFICE.

CHARLES R. MYERS, OF CLEVELAND, OHIO.

TREE SURGERY.

1,076,441.

Specification of Letters Patent. Patented Oct. 21, 1913.

Application filed November 15, 1912. Serial No. 731,468.

*To all whom it may concern:*

Be it known that I, CHARLES R. MYERS, citizen of the United States, residing at Cleveland, in the county of Cuyahoga and State of Ohio, have invented certain new and useful Improvements in Tree Surgery, of which the following is a specification.

This invention relates to what has become known as tree surgery, and the invention consists in the method of and means for treating a trunk or a branch of a tree which has a decayed or unsound spot or portion adapted to be cleansed and filled, all substantially as shown and described and particularly pointed out in the claims.

Figure 1:
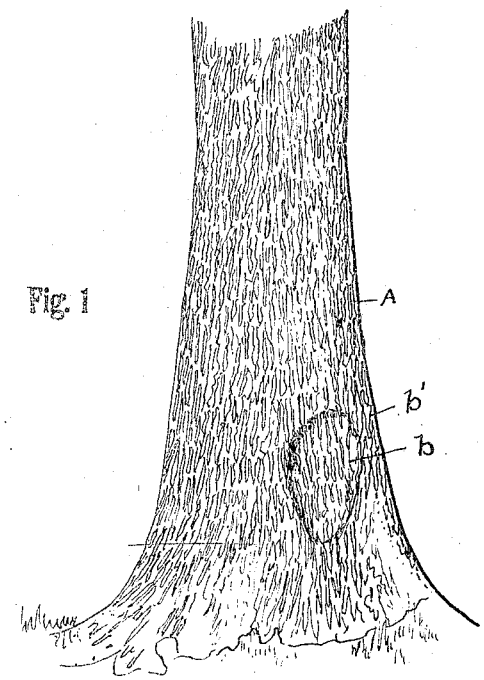
Figure 3:
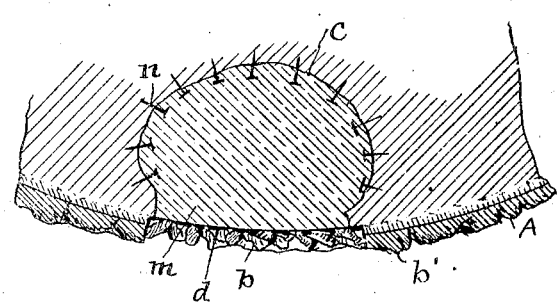
Figure 2:
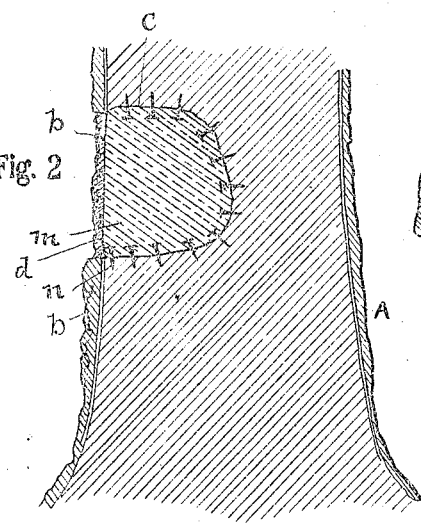
Figure 4:
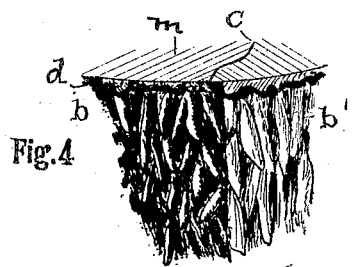

In the accompanying drawings, Figure 1 is a view of the trunk of a tree showing an artificially covered cavity in its base according to my invention. Fig. 2 is a vertical section of said tree through said cavity, and Fig. 3 is a horizontal section of the tree through said cavity. Fig. 4 is a composite view of natural and artificial bark as hereinafter described.

As thus shown A represents the tree and C the cavity therein. In practice, all dead and decayed and unsound wood is carefully removed from the affected portion of the tree down to the point where the wood is sound and solid and serves as a base upon which to build the proposed filling. Usually the wall of the cavity is first sterilized by means of copper sulfate or the like, and then coated or covered with tar, creosote, rosin or a like material which prepares the cavity for the cement or equivalent filling, which is tamped and packed solidly in the cavity to exclude air and moisture. It also is usual to drive nails $n$ in scattered positions in the cavity and to fill the cement over and about the same so that the nails will serve as anchorage and hold the cement firmly in place. The said filling is then rounded off on its face to conform to the general contour of the tree about the edge of the cavity and is scraped, if necessary, to bring the surface even with the sap wood of the tree. This retires the surface of the fill somewhat and even with the sap wood, as shown, but within the cambium layer or growth over said surface. The next step in the invention consists in preparing the exposed or outer surface of the said filling $m$ for the application of a covering of artificial bark, indicated by $b$. To this end I first apply a coating of lampblack $d$, or its equivalent, to the surface of the cement in a dry state and so as to cover said surface and form a ground for the artificial bark $b$. This bark may be constituted out of any suitable substance and of any color but when finished is designed to have the appearance as nearly as possible of the natural bark of the tree. The said artificial bark, however, is peculiar and original in this particularly, that while it retains its place over the lampblack, which prevents it from becoming actually cemented to the cement filling, it is held firmly enough to retain its place as a coat or cover and yet is of a yielding nature and adapted to be pushed ahead in a more or less disintegrated state by the cambium growth of the tree. The said growth seeks naturally to overgrow the wound and hence approaches uniformly on all sides and in time will actually crowd off the said artificial bark and supply a cover of natural bark. The artificial bark therefore must be of a character which will endure exposure to the elements and remain in place and yet surrender to pressure and break away before the advancing growth of the tree. Fig. 4 illustrates the said bark $b$ at the left compared with the natural bark $b'$ at the right, and to facilitate its gradual removal as the growth of the tree advances the said artificial bark is thrown up or molded or otherwise applied not only to resemble the natural bark to the eye but with a more or less short ribbed effect with comparatively slight depth between the ribs so as to be the more easily broken or pushed off by the growth of the cambium layer.

The steps herein first recited, such as preparing the cavity and filling the same with cement, are not new at this time and are not claimed, and the real novelty resides in the application to the cement or filling of certain finishing and artificial coatings and coverings not hitherto known and which leave a treated tree with its sores not only healed but to all appearances grown over by natural bark and not noticeable unless attention be especially directed thereto.

Any available means may be employed to give the artificial bark the rib-like contour which is found in some varieties of trees, as in the example shown in Fig. 1, but this suggests that the said substance or material must be moldable or plastic at least at the time of its application, and the fact that the tree in its growth across the surface of its wound is intended to be such as will force the said material off in advance of its growth the further conclusion follows that the said material remains in a measurably yielding state.

It will be seen that the artificial bark, coat or cover $b$ is of less total depth than the natural bark of the tree shown in the drawings, but this would not be so noticeable if the tree had a thin smooth bark as in many cases.

What I claim is:

1. The method of surfacing a cement filling in a tree which consists in first coating the said filling with a dry substance like lampblack and then applying an adhesive plastic coating over the said dry substance of a kind adapted to be pushed off by the cambium growth of the tree and shading the surface of said coating to make the same conform to the outline and appearance of the natural bark of the tree.

2. The method herein described of treating a diseased portion of a tree consisting, first, in removing all the decayed wood in and about the portion under treatment; then suitably sterilizing the wall of the cavity produced by such cleansing and filling the same with a cement mixture, and at last covering the exposed surface of the said filling with a frangible material finished to resemble the natural bark of the tree in color and contour and adapted to be pushed off by the cambium growth of the tree.

In testimony whereof I affix my signature in presence of two witnesses.

CHARLES R. MYERS.

Witnesses:
E. M. FISHER,
F. C. MUSSUN.